US005858419A

United States Patent [19]

Haeberli

[11] Patent Number: 5,858,419

[45] Date of Patent: Jan. 12, 1999

[54] MACHINE FOR THE FORMATION OF TABLETS OF COSMETIC PRODUCT

[75] Inventor: Adrian Haeberli, Zürich, Switzerland

[73] Assignee: Aktiengesellschaft Fur Geld-Und Kapitalanlagen, St. Moritz, Switzerland

[21] Appl. No.: 766,769

[22] Filed: Dec. 13, 1996

[30] Foreign Application Priority Data

Dec. 14, 1995 [IT] Italy ............................ MI95A 002620

[51] Int. Cl.[6] ............................. B29C 43/56; B65B 1/04

[52] U.S. Cl. .......................... 425/364 R; 141/12; 141/73

[58] Field of Search .................................. 425/83.1, 335, 425/363, 364 R, 817 R; 141/12, 102, 71, 73, 101, 121, 125, 137, 280

[56] References Cited

U.S. PATENT DOCUMENTS

| | | | |
|---|---|---|---|
| 3,907,479 | 9/1975 | Platte et al. | 425/371 |
| 4,153,084 | 5/1979 | Payne | 141/80 |
| 4,217,939 | 8/1980 | Yanagihara et al. | 141/1.1 |
| 4,447,382 | 5/1984 | Spurlock et al. | 264/123 |
| 5,363,887 | 11/1994 | Haeberli | 141/12 |
| 5,394,670 | 3/1995 | Visser | 53/249 |
| 5,406,990 | 4/1995 | Haeberli | 141/12 |

FOREIGN PATENT DOCUMENTS

| | | |
|---|---|---|
| 0561444 | 9/1993 | European Pat. Off. . |
| 0 623 517 | 9/1994 | European Pat. Off. . |
| 3146094 | 6/1983 | Germany . |
| 1133147 | 11/1968 | United Kingdom . |

*Primary Examiner*—Robert Davis
*Attorney, Agent, or Firm*—Jacobson, Price, Holman & Stern, PLLC

[57] ABSTRACT

A machine for the formation of tablets of cosmetic product includes a feeding device for a cosmetic product in powder to a movable conveyor belt so as to form on the conveyor belt a layer of cosmetic product and a portioning and compression device for the layer of cosmetic product for the formation of tablets of cosmetic product. The conveyor belt includes a belt in a material permeable to air. The machine includes a supporting plate with a plurality of through holes placed under the belt of the conveyor belt opposite the portioning and compression device, to allow the air to escape during the formation of the tablets.

9 Claims, 4 Drawing Sheets

MACHINE FOR THE FORMATION OF TABLETS OF COSMETIC PRODUCT

FIELD OF THE INVENTION

The present invention relates to a machine for the formation of tablets of cosmetic product.

BACKGROUND OF THE INVENTION

There are known in the art, for example from EP-A-0561444, machines for the formation of tablets of cosmetic product. Said machines comprise feeding means (for example feeding hoppers) of a cosmetic product in powder to a conveyor belt and levelling means (fixed divider panels) placed downstream from the feeding means to determine the formation of a levelled layer of cosmetic product that is moved by said conveyor belt. The tablets are formed by portioning the levelled layer of cosmetic product by means of hollow punches movable vertically that, from a raised position, are lowered so as to immerse them in the layer of cosmetic product; pressure pistons slidable inside the hollow punches then compress the portion of cosmetic product contained in the hollow punch itself against the conveyor belt, and the hollow punches, containing the tablet of cosmetic product, are then raised again and moved to an area of deposition of the tablets of cosmetic product in special containers.

In such machines, the belt forming the conveyor belt is in a material impermeable not only to the cosmetic powder but also to air, and in the area of formation of the tablets under said belt there is a metal supporting plate that reacts against the thrust of the hollow punches and of the corresponding pressure pistons.

A drawback of these machines is that the air present in the layer of cosmetic powder and in the hollow punches, not finding a way of escape during the compression of the portions of cosmetic product for the formation of the tablets, cause the inglobation of the particles of air in the product and consequent stratifications and other irregularities in the tablets of cosmetic product.

SUMMARY OF THE INVENTION

In view of the described state of the art, the object of the present invention is to provide a machine for the formation of tablets of cosmetic product that is not subject to the abovementioned drawback.

According to the present invention, such object is attained by means of a machine for the formation of tablets of cosmetic product comprising feeding means of a cosmetic product in powder to a movable conveyor belt, so as to form on said conveyor belt a layer of cosmetic product and portioning and compression means of the layer of cosmetic product for the formation of tablets of cosmetic product, characterized in that said conveyor belt comprises a belt in a material permeable to air, and in that it comprises a supporting plate with a plurality of through holes placed under said belt of the conveyor belt opposite said portioning and compression means, to allow the air to escape during the formation of the tablets of cosmetic product.

Preferably, said belt of the conveyor belt is in a porous material.

Thanks to the machine according to the present invention, and precisely thanks to the fact that the belt of the conveyor belt is in a material permeable to air and the supporting plate has a plurality of through holes, it is possible to avoid that, during the formation of the tablets of cosmetic product, inside said tablets there are englobed particles of air.

These and other features of the present invention will be made more evident by the following detailed description of an embodiment thereof, illustrated as a non-limiting example in the enclosed drawings, wherein:

DETAILED DESCRIPTION OF THE PREFERRED EMBODIMENTS

Figure 1:
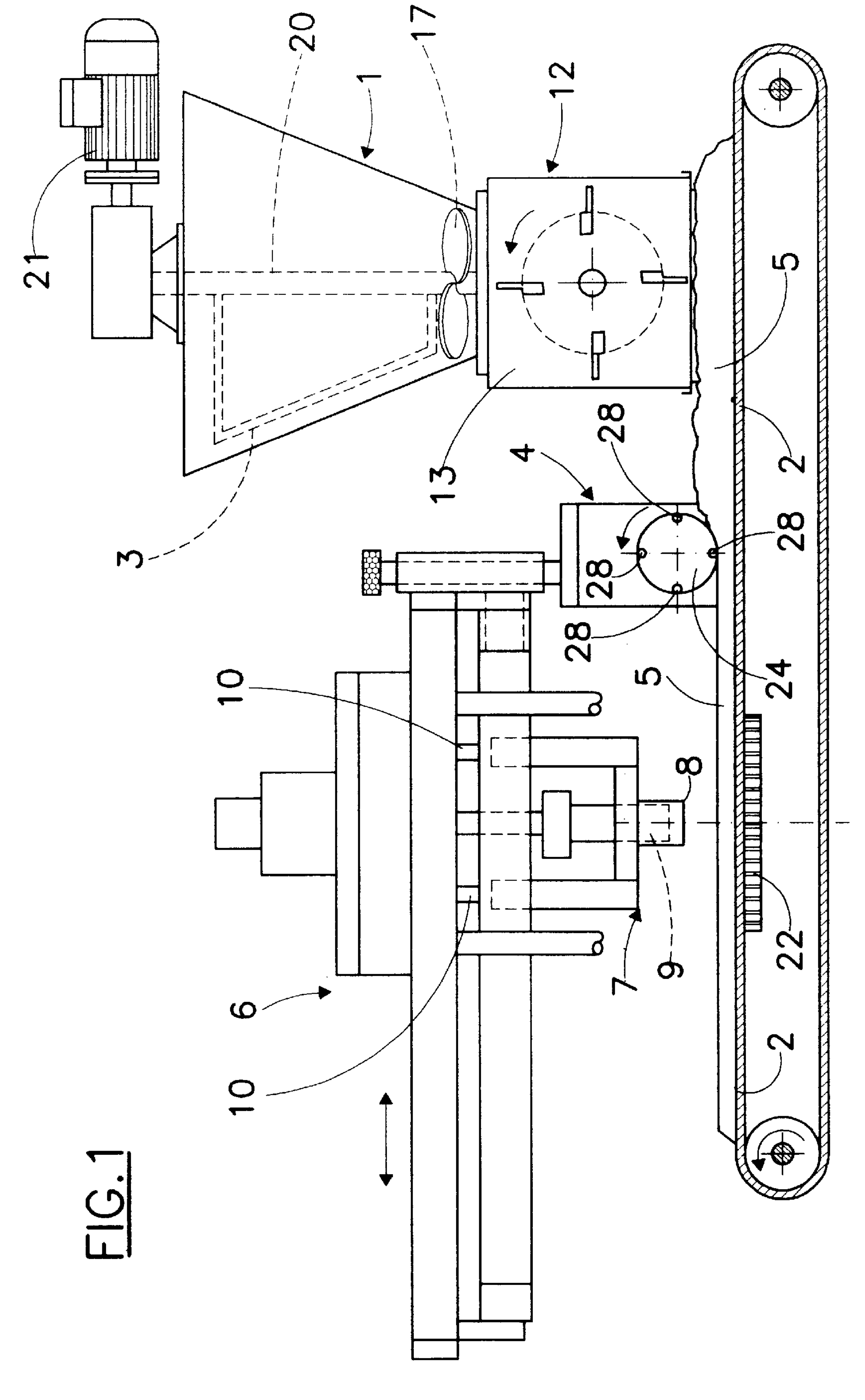
FIG. 1 is a view in elevation and partially sectioned along a vertical longitudinal plane of a machine according to the present invention.

With reference to FIG. 1, there is shown therein a machine according to the invention that comprises a hopper 1 for feeding the cosmetic product in powder to an underlying conveyor belt 2. Inside the hopper 1 there is a stirrer 3 for homogenizing the cosmetic powder and a thrust screw 17 for the cosmetic powder, the screw 17 and the stirrer 3 being connected to the same driving shaft 20 operated by a motor 21.

Figure 3:
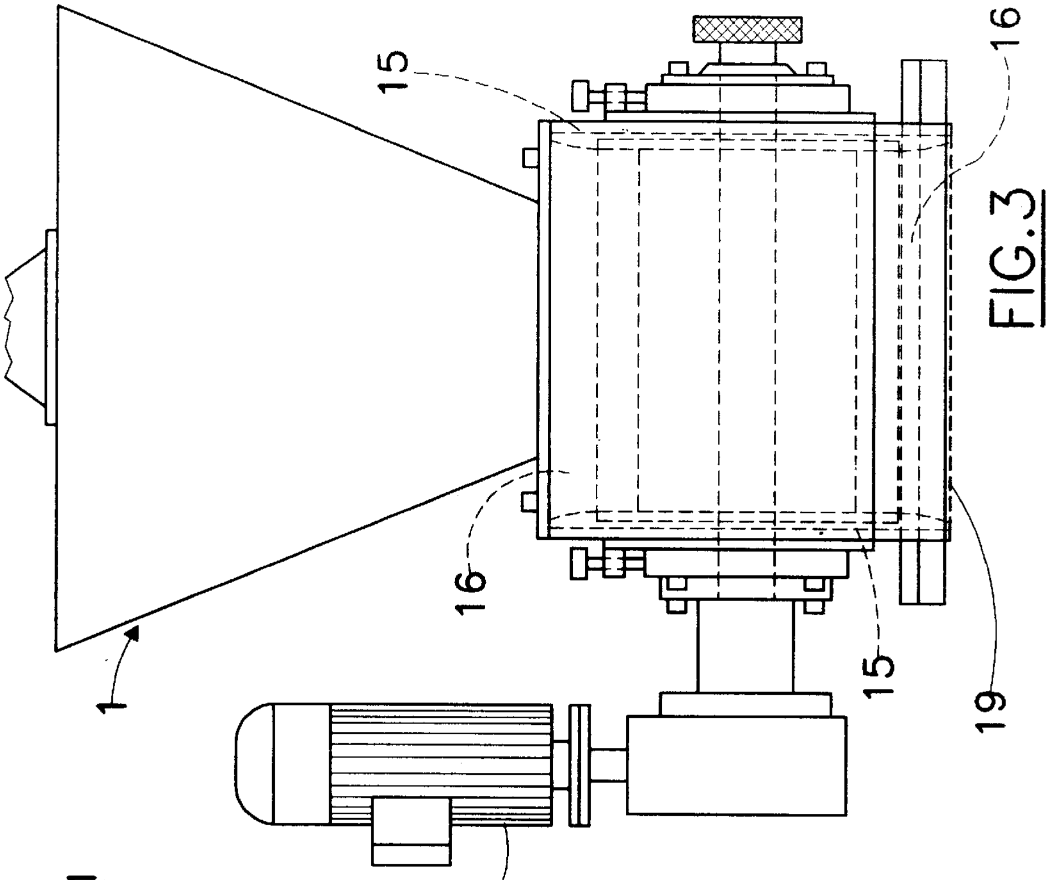
FIG. 3 is a view from the left of the hopper of FIG. 2.
Figure 2:
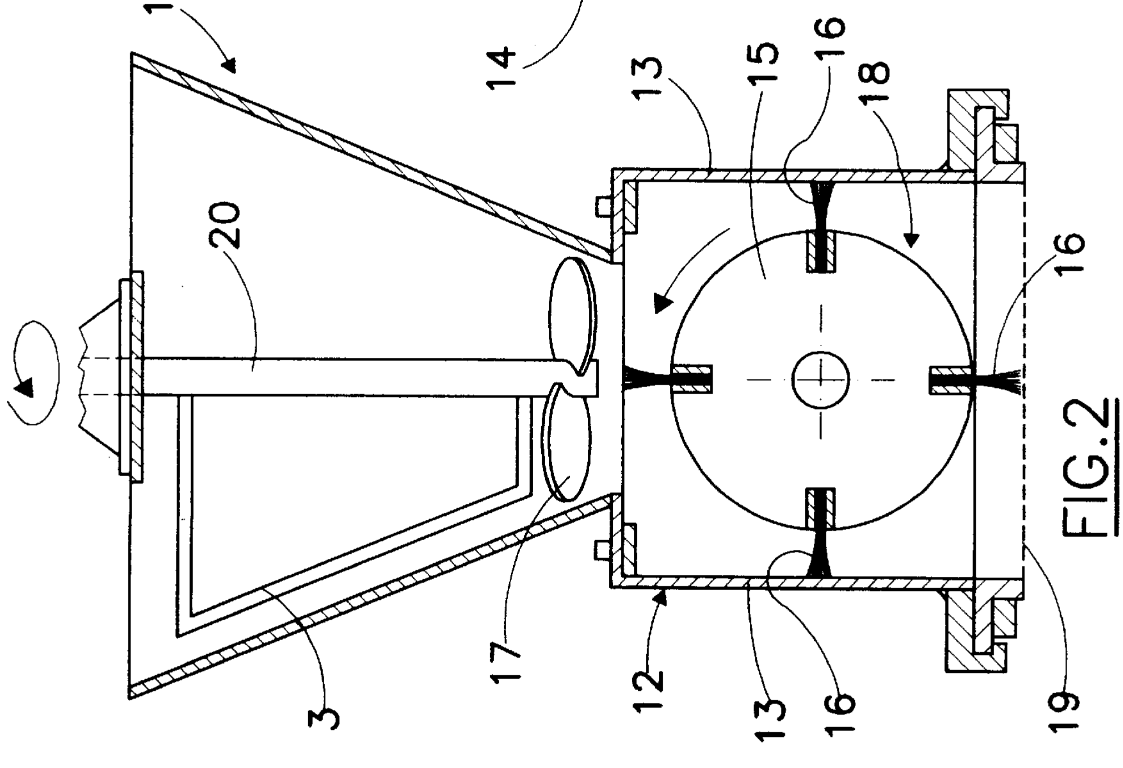
FIG. 2 is a cross-sectional view along a vertical longitudinal plane of a feeding hopper of cosmetic powder to a conveyor belt of the machine of FIG. 1.

Under the hopper 1 there is also a device 12 for the further homogenization of the cosmetic powder. Such device 12, better visible in FIGS. 2 and 3, comprises a boxed chassis 13 inside which there rotates a rotor 18 driven by a motor 14; the rotor 18 comprises two integral disks 15 between which there extend, in circumferential succession along the circumference of the two disks 15, four radial brushes 16. Under the rotor 18, opposite a delivery port of the chassis 13, there is a sieve 19 for homogenizing the cosmetic powder.

Along the conveyor belt 2, downstream from the hopper 1, there is a levelling device 4 (that will be described in greater detail later) for levelling a layer of cosmetic product 5 that is formed on the conveyor belt 2.

The levelling device 4 is mounted on a supporting frame 6 of a device 7 for withdrawing and pressing the cosmetic powder for the formation of tablets of cosmetic product. Said device for withdrawing and pressing is known in itself, and comprises a hollow metal punch 8 inside which a pressing piston 9 is slidably housed. The hollow metal punch 8 can slide along respective vertical guides 10 between a raised position (shown in FIG. 1) and a lowered position (visible in FIG. 5) wherein it is immersed in the levelled layer of cosmetic product.

The device 7 for withdrawing and pressing is also movable in the longitudinal direction of the conveyor belt 2 between a position of formation of the tablets of cosmetic product and a position (not shown) wherein said tablets are released in respective special containers.

Figure 8:
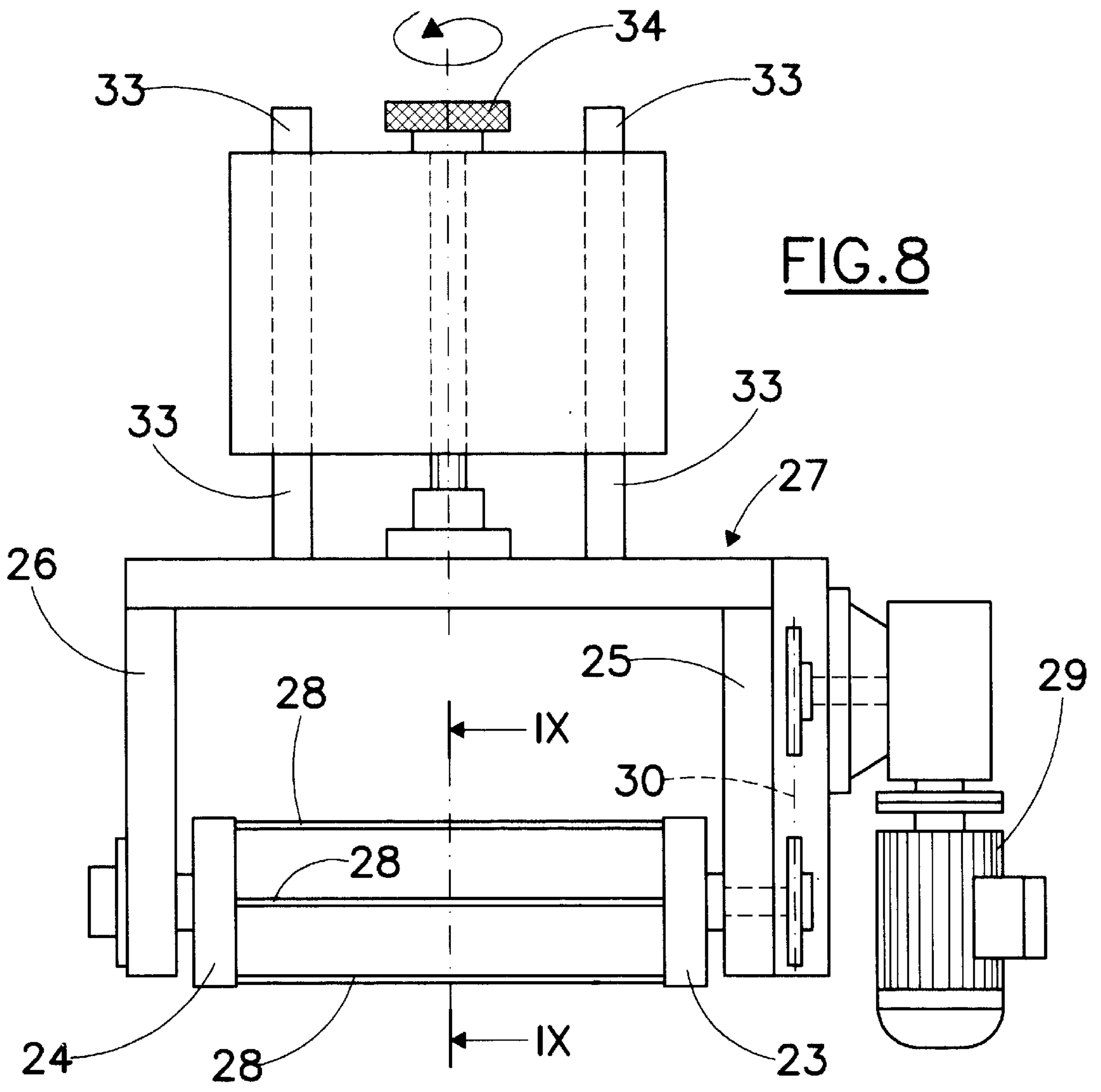
FIG. 8 shows in detail the levelling means seen in the longitudinal direction of the conveyor belt.
Figure 9:
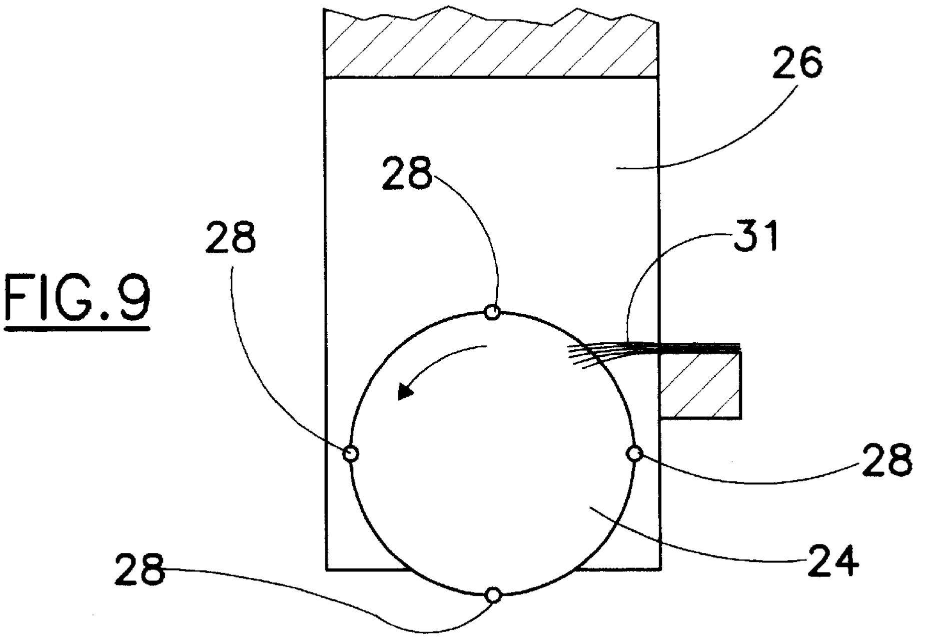
FIG. 9 is a cross-sectional view in an enlarged scale along the line IX—IX of FIG. 8.

The levelling device 4, shown in detail in FIGS. 8 and 9, comprises two disks 23, 24 placed on the sides of the conveyor belt 2 and hinged to two respective sides 25, 26 of a chassis 27. Between the disks 23 and 24 there are strung four wires 28, preferably of steel, uniformly distributed along the circumference of the disks 23 and 24. A motor and gearbox 29 and a belt transmission 30 place the disks 23 and 24, and thus the wires 28, in a movement of rotation round the axis of the disks 23, 24, in a direction such as to oppose the movement of translation of the conveyor belt 2 (in the example of FIG. 1, the disks 23 and 24 rotate in an anticlockwise direction while the conveyor belt 2 moves from right to left). With the chassis 27 there is also associated a brush 31 for cleaning the wires 28 at every one of their turns (FIG. 9). The chassis 27 is also movable in a vertical direction along two guides 33 so as to move the wires 28 away from or nearer to the conveyor belt 2, by means of an adjustment screw 34.

The two disks 23, 24 carrying the wires 28 can be made to rotate by the motor and gearbox 29 at a speed ranging from 100 rpm to 2000 rpm. Since the wires 28 are very thin, the surface of the layer of cosmetic product 5 downstream from the levelling device 4 is extremely smooth. Moreover, the rate of rotation of the wires 28 can be selected on the basis of the particular features of the cosmetic product.

Figure 4:
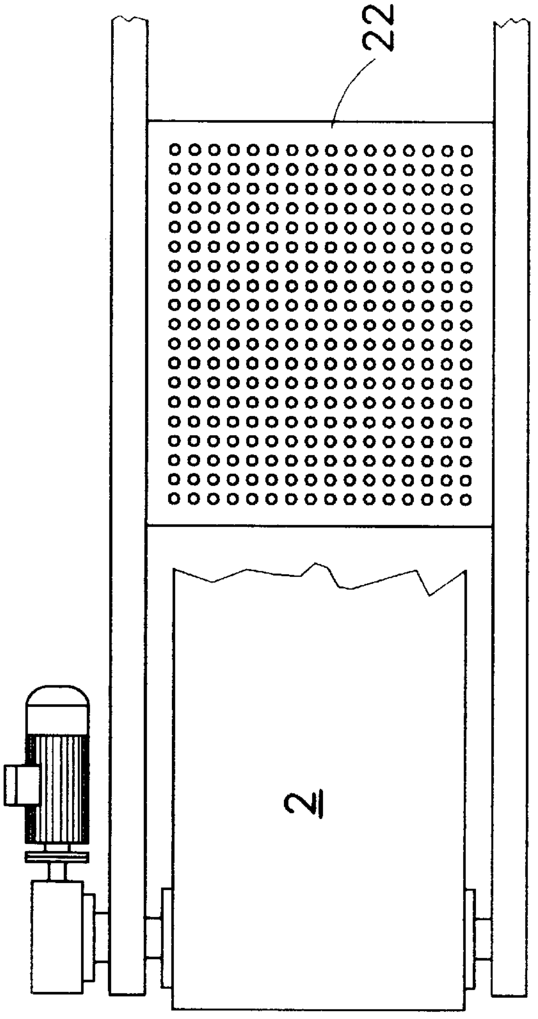
FIG. 4 is a plan view of a part of the conveyor belt.

The conveyor belt consists of a belt in a porous material permeable to air. As visible in FIG. 4, in the area of formation of the tablets of product, under the conveyor belt 2 there is a drilled plate 22 that acts as a supporting plane for the hollow punch 8 when it is immersed in the layer of cosmetic product 5 for the formation of the tablet.

Figure 5:
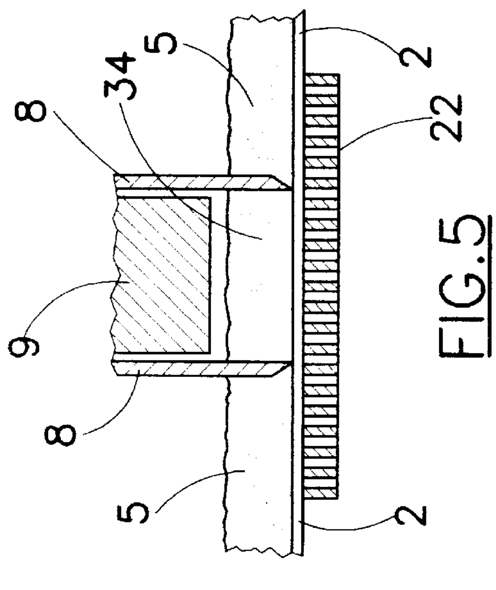
FIGS. 5–7 show three steps of the process for the formation of a tablet of cosmetic product.
Figure 6:
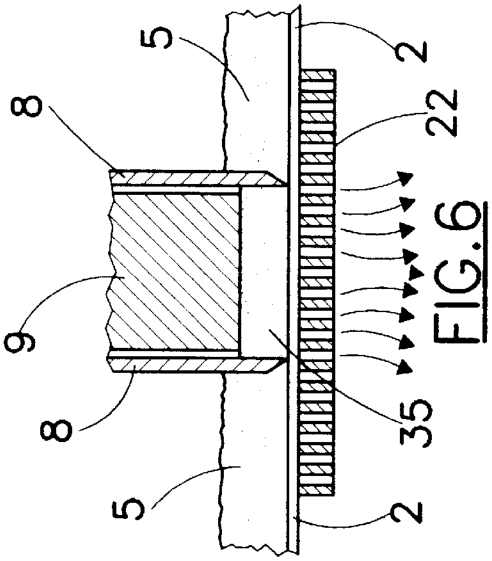
Figure 7:
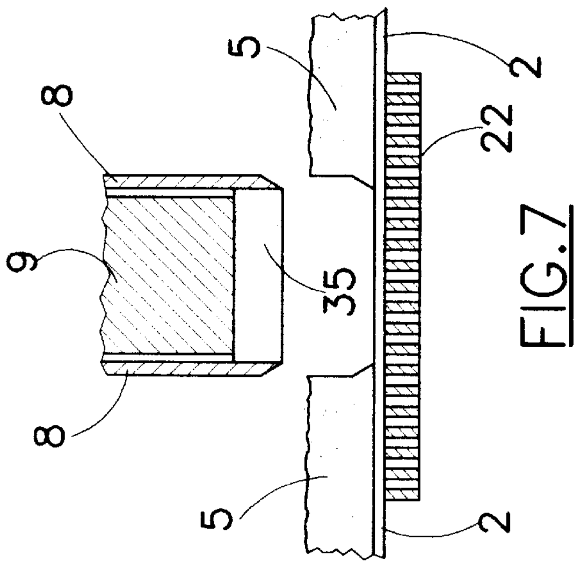

The three steps of the formation of a tablet of cosmetic product starting from the levelled layer of cosmetic product 5 are shown in FIGS. 5–7. First, starting from the raised position of FIG. 1 the hollow punch 8 is lowered so as to immerse itself in the layer of cosmetic product 5, thus isolating a portion 34 of cosmetic product. Then, the piston 9 slidable inside the hollow punch 8 is lowered so as to compress the portion 34 of cosmetic product, thus creating a tablet 35. During this step, the drilled plate 22 acts as a supporting and reaction plane for the piston 9; thanks to the fact that the conveyor belt is made of a porous material permeable to air, and to the fact that the supporting plate is drilled, during the descent of the piston 9 and the compression of the portion 34 of cosmetic product the air present in the layer of cosmetic powder 5 and in the hollow punch 8 is expelled through the holes of the plate 22, and does not cause the formation of air bubbles inside the tablet 35. Subsequently, the hollow punch 8 is raised again, taking with it the tablet 35 held between its lateral walls.

I claim:

1. A machine for the formation of tablets of cosmetic product comprising feeding means for feeding a cosmetic product in powder to a movable conveyor belt so as to form on said conveyor belt a layer of cosmetic product and portioning and compressing means for portioning and compressing the layer of cosmetic product for the formation of tablets of cosmetic product, said conveyor belt comprises a belt in a material permeable to air, and a supporting plate with a plurality of through holes placed under said belt of the conveyor belt opposite said portioning and compressing means, to act as a reaction plane for the compressing means and to allow the air to escape through said holes during the formation of the tablets of cosmetic product.

2. A machine according to claim 1, wherein said belt of the conveyor belt is in a porous material.

3. A machine according to claim 2, wherein said portioning and compression means of the layer of cosmetic product comprise at least one hollow punch inside which there is slidably housed a respective compression piston, said at least one hollow punch being movable vertically between a raised position with respect to the conveyor belt and a position wherein it is immersed in the layer of cosmetic product to circumscribe a portion of cosmetic product, said supporting plate providing a support for the reaction to a compression thrust of said compression piston during the formation of the tablet of cosmetic product.

4. A machine according to claim 1, wherein said feeding means of the cosmetic product comprise a hopper and a device for homogenizing the cosmetic product, said homogenizing device being placed under the hopper and comprising a rotor with radial brushes and a sieve placed under said rotor.

5. A machine according to claim 1, further comprising levelling means of the layer of cosmetic product on the conveyor belt placed downstream from said feeding means for forming a layer of cosmetic product that is levelled.

6. A machine according to claim 5, wherein said levelling means comprise a plurality of elements placed in circumferential succession and extending in a direction transversal to the direction of translation of said conveyor belt, said elements being placed in rotation round a common axis of rotation, transversal to the direction of translation of the conveyor belt, in a direction such as to oppose the movement of translation of the layer of cosmetic product that is not levelled on the conveyor belt.

7. A machine according to claim 6, wherein said elements are steel wires.

8. A machine according to claim 7, wherein said levelling means comprise a pair of disks placed on opposite sides of the conveyor belt, and a plurality of wires strung between the two disks and uniformly distributed along the circumference of said two disks, there being provided movement means at a variable speed for communicating to said disks a movement of rotation in said direction such as to oppose the movement of translation of the layer of cosmetic product that is not levelled on the conveyor belt.

9. A machine according to claim 7, further comprising brush means for the continuous and automatic cleaning of the wires.

* * * * *